Patented July 24, 1934

1,967,350

UNITED STATES PATENT OFFICE

1,967,350

HORMONE AND PROCESS OF OBTAINING THE SAME

Edward A. Doisy, Webster Groves, Sidney A. Thayer, St. Louis, Mo., and Clement D. Veler, Bowling Green, Ohio, assignors to President and Board of Trustees of St. Louis University, St. Louis, Mo.

No Drawing. Application March 3, 1930, Serial No. 432,970

11 Claims. (Cl. 167—74)

The invention relates to a new and useful therapeutic product comprising the isolated ovarian follicular hormone, and also relates to the process of isolating said hormone and obtaining the same in the form of a pure crystalline compound free from the impurities that have always heretofore been associated therewith.

The primary object of our invention is to obtain the isolated ovarian follicular hormone in the pure crystalline state. Another object is to obtain a product containing the previously crystallized hormone in such a state of concentration as to be an effective therapeutic agent.

A further object of the invention is to prepare from urine a therapeutic product free from the disagreeable odor of urine and containing the hormone in concentrated form.

Another object is to prepare a product containing the ovarian follicular hormone in concentrated form sufficiently free from impurities normally associated therewith in the natural products from which it is derived to permit the administration to humans without substantial side reactions.

These and other objects have been attained by the development of the processes and products hereinafter set forth.

The physiological effects of the ovarian follicular hormone consist in the promotion of the growth of the uterus, vagina and mammary glands. The hormone, even when administered to ovariectomized animals, can restore full growth of the genital tract and call forth the sexual manifestations characteristic of estrus. Based upon this physiological effect, a quantitative evaluation of the hormone may be obtained and in the following discussion the potency of the product is expressed in terms of rat units.

A rat unit is defined as the minimal total amount of hormone necessary to induce estrus with complete cornification, as judged by the smear method, in an ovariectomized sexually mature rat weighing 140 (plus or minus 20) grams. For physiological reasons three injections are given at intervals of four hours. Normally, many rats are used in each assay and twenty rats are used with each dilution. The minimum volume with which a positive response is obtained in 75% of the animals is taken as containing one unit.

According to our invention we have obtained a therapeutic product containing the ovarian follicular hormone in such concentration that a single milligram corresponds to approximately 4000 rat units. This product is substantially free from impurities and is without doubt the isolated ovarian follicular hormone itself. Because of its purity the new product may be administered in adequate dosage as desired and all side reactions are avoided because of the freedom from foreign by-products.

While our product may be derived from various sources, we have found that the most practical and economical material for the preparation is the urine of pregnant animals or of humans. Although it is found that the concentration of the hormone increases as pregnancy progresses, the hormone is present in sufficient amounts throughout this period so that no special selection of urine is required.

By means of our invention therefore we have obtained a therapeutic product derived from urine containing the concentrated hormone but entirely free from the disagreeable and characteristic odor of urine.

A practical method for isolating the ovarian follicular hormone from the urine of pregnant women is as follows:

Step 1. A 100 liter quantity of urine is adjusted by the addition of acid (hydrochloric acid is preferred but not essential) to a pH of 4 and extracted with a suitable solvent such as n-butyl alcohol, benzol, chloroform or ether in a continuous extraction apparatus. By using the countercurrent principle we find that this volume of urine may readily be extracted during one day's time and the active fraction transferred completely to a 4 liter volume of butyl alcohol. This alcoholic solution is chilled and filtered from salts and other insoluble matter.

Step 2. The butyl alcohol extract is distilled to dryness in vacuum and the brown tarry residue, weighing usually 300 to 600 grams, is extracted with benzol using successive volumes of 1.5, 1.0, and 0.75 liters of hot benzol, which treatment dissolves the active principle.

Step 3. The benzol solution is then chilled, poured from the insoluble matter and distilled using a vacuum to complete removal of benzol. The residue from the distillation is treated with 200 cc. of butyl alcohol to which solution or suspension 4 liters of petroleum ether (60–80° C.) are added. The resultant solution and suspension then extracted five to eight times with 800 cc. volumes of water to each portion of which sufficient 10% NaOH is added to maintain a reaction alkaline to phenol phthalein. In this manner the hormone is transferred to the alkaline aqueous solution. This solution is chilled to 2° C.

for a day and poured from tarry material which separates.

Subsequent purification of the hormone is based upon the fact that it possesses a sufficient acidic property so that it can be removed from certain organic solvents by means of alkali, and that it can be removed in turn from alkaline solutions by successive extractions with organic solvents.

Step 4. The slightly alkaline aqueous solution is extracted five times with successive (800–1200 cc.) portions of sulphuric ether (peroxide-free). This combined ether extract is then distilled and the active residue treated first with 80 cc. butyl-alcohol and then with 1500 cc. of petroleum ether as in Step 3.

Step 5. The petroleum ether solution is then extracted 4 to 6 times with 300 cc. portions of dilute (N/10) NaOH solution and filtered. The alkaline filtrate is then extracted six times with 400 cc. portions of sulfuric ether, thus again transferring the hormone to ether solution.

Up to this stage usually 60–75% of the total activity is accounted for. For example, in a typical experiment the original crude material contained 300,000 units and the assay of the ether solution obtained at the end of Step 5, assayed fully 200,000 units. In the subsequent steps, however, a considerable amount of scattering of the active material occurs and hence all by-products are worked back into the process.

Step 6. The ether solution is distilled to dryness and yields a yellowish oil. (If this is inoculated with crystals of the hormone a preliminary crop of crystals may be obtained here). The oil is leached with 200–240 cc. of cold 0.2N NaOH solution, repeating the extraction 4 or 5 times, and combining and filtering the alkaline extract. This aqueous alkaline solution is then extracted with six successive portions of sulfuric ether using about 300 cc. of peroxide-free ether for each extract.

Step 7. The ether solution resulting from Step 6 is distilled and the residue crystallized from 25% aqueous ethyl alcohol or from 25% aqueous acetone.

As an alternative method of procedure, the following may be substituted for Steps 4 to 7 inclusive of the above process.

After distilling the benzol, the tarry mass may be stirred directly with 2000 cc. of hot 0.3N NaOH with a mechanical stirrer. The suspension is chilled and the supernatant liquid poured or siphoned off. Repetition of the extraction two or three times is advisable. The alkaline aqueous solution is then extracted five or six times with 400 cc. portions of sulfuric ether, thus transferring the hormone to ether solution.

After distillation of the ether the residue is steam distilled as long as a distillate other than water is obtained. The condensed water is removed by vacuum distillation and the small amount of dark tarry residue leached five times with 50 cc. of hot 0.3N NaOH. This solution is filtered and the filtrate extracted with sulfuric ether—100 cc.—six times. The ether solution is distilled and the residue leached with cold 0.3N NaOH using 20 cc. five times. This alkaline solution is filtered and extracted with 50 cc. of sulfuric ether five times. Upon distillation of the ether and solution of the residue in a small quantity of hot ethyl alcohol, the hormone separates in semi-crystalline balls which may be filtered off. A further quantity is obtained by adding 3 volumes of water to the alcoholic solution. It may be recrystallized from 25% aqueous ethyl alcohol or from 25% aqueous acetone or from any of the following—chloroform, benzol, ethyl acetate, ethyl ether or petroleum ether.

The final product consists of colorless crystals which, when crystallized from dilute alcohol, possess a distinct rhomboid outline. Larger crystals may possess a six sided tabular development. For identification purposes the following crystallographic data is of value:

System-monoclinic, indices of refraction $\alpha=1.520$, $\beta=1.642$, $\gamma=1.692$, $2V=55°$, tabular development on 010, pronounced basal cleavage nearly perpendicular to $Bxa$.

The crystals melt at 242–243° C. (248–249° C. corrected) with some decomposition. Their approximate solubility at room temperature (about 25° C.) is as follows:

| | Percent |
|---|---|
| Chloroform | 0.5 |
| Benzol | 0.2 |
| Ethyl acetate | 1 |
| Ethyl ether | 0.5 |
| Petroleum ether | 0.1 |
| Ethyl alcohol (95%) | 1.0 |
| Acetone | 0.5 |

The most characteristics property of this crystalline substance is its physiological behavior since it produces the characteristic effects upon the genital system as already outlined. A biological assay of the crystals shows that one milligram is equivalent to fully 4000 rat units.

The purity of this product is shown by the fact that it may be, and has been, crystallized successively nineteen times using various solvents listed above, but without diminution of its physiological effect. This result offers conclusive evidence that we have obtained the long-sought-for pure hormone.

For the practical utilization of this product it is, of course, understood by all those skilled in the art that it is utilized therapeutically in suitable dilute aqueous or oily solutions for hypodermic or oral administration. For oral use the dry powder may be combined with a suitable diluent and compressed into tablets.

The use of the product is indicated therapeutically in those disorders characterized by deficient ovarian secretion.

In the above description we have outlined a highly practical process for the application of our invention, and although specific details have been supplied so that no one will experience difficulty in duplicating our results, nevertheless it will be understood that variation in proportions, and even in the nature of the solvents used, may be made as in most other definite chemical procedures and yet the same result achieved. Thus, for example, the hormone may be transferred from its solution in organic solvents to the aqueous alkaline solution by a single extraction with alkali provided concentrated and/or hot solutions are used. Similarly the hormone may be retransferred more readily to the organic solvent by acidifying the alkaline solution. Such procedure, however, is less efficient for the separation of impurities.

Attention is directed to the copending application of Edward A. Doisy, Serial No. 486,875, filed October 6, 1930, which discloses and claims an invention relating to products containing the ovarian follicular hormone and processes for obtaining the same.

What we claim as our invention is:

1. The ovarian follicular hormone, a crystalline solid having a melting point of approximately 249° C., slightly soluble in ethyl alcohol and having a physiological activity of the order of 3000 or more rat units per milligram where a rate unit represents the total amount of hormone necessary to induce estrus with complete cornification in an ovariectomized sexually mature rat weighing approximately 140 grams.

2. A crystalline substance derived from urine pregnant animals, said substance being an ovarian hormone, having a melting point of approximately 249° C., being slightly soluble in ethyl alcohol and having a physiological activity of the order of 3000 or more rat units per milligram where a rat unit represents the total amount of hormone necessary to induce estrus with complete cornification in an ovariectomized sexually mature rat weighing approximately 140 grams.

3. The isolated ovarian follicular hormone, a colorless crystalline solid having a melting point of approximately 249° C. and possessing the following crystallographic properties:—monoclinic system, indices of refraction $\alpha=1.520$, $\beta=1.642$, $\gamma=1.692$, $2V=55°$, tabular development 010 and pronounced basal cleavages nearly perpendicular to B$x\alpha$.

4. A crystalline substance derived from urine pregnant animals, said substance being an ovarian hormone, being slightly soluble in ethyl alcohol, chloroform, benzol, ethyl acetate, ethyl ether and petroleum ether, having crystallographic properties as follows:—monoclinic system, indices of refraction $\alpha=1.520$, $\beta=1.642$, $\gamma=1.692$, $2V=55°$, tabular development 010 and pronounced basal cleavages nearly perpendicular to B$x\alpha$ and having a physiological activity of the order of 3000 or more rat units per milligram where a rat unit represents the total amount of hormone necessary to induce estrus with complete cornification in an ovariectomized sexually mature rat weighing approximately 140 grams, and said substance being capable of successive recrystallization without substantial diminution of physiological effect.

5. In the process of obtaining an ovarian hormone from extracts containing the same, the step of fractionally distributing a solution containing said hormone between an aqueous alkaline solution and a water-immiscible organic solvent non-reactive to said hormone.

6. In the process of obtaining an ovarian hormone from extracts containing the same, the steps of reversibly distributing said hormone between an aqueous alkaline solution and a water-immiscible organic solvent non-reactive to said hormone by alternately treating a solution of said hormone in said organic solvent with an aqueous alkaline solution, separating the solution from the residue, extracting said aqueous alkaline solution with said organic solvent and evaporating said organic solvent thereby obtaining a residue having the hormone in concentrated form.

7. In the process of obtaining an ovarian hormone from extracts containing the same, the steps of reversibly distributing said hormone between an aqueous alkaline solution and a water-immiscible organic solvent of the class comprising sulphuric ether, petroleum ether, benzol, chloroform and butyl alcohol, by alternately treating a solution of said hormone in an organic solvent of the class aforesaid with an aqueous alkaline solution, separating the solution from the residue, extracting said aqueous alkaline solution with a water-immiscible organic solvent of the class aforesaid and evaporating said organic solvent thereby obtaining a residue having the hormone in concentrated form.

8. In the process for obtaining an ovarian hormone from solutions containing the same, the steps of treating a butyl alcohol solution containing said hormone with petroleum ether, treating the resultant solution with an alkaline aqueous solution, thereby transferring the hormone to the alkaline aqueous solution, removing the solution from the residue, extracting said aqueous solution with sulphuric ether, evaporating the ether, dissolving the residue in butyl alcohol, adding petroleum ether, extracting with alkaline aqueous solution, removing the solution from the residue, extracting said aqueous solution with sulphuric ether, distilling the ether yielding a residue and crystallizing the residue from a reagent of the class consisting of alcohol and acetone.

9. In the process for obtaining an ovarian hormone from extracts containing the same, the steps of reversibly distributing said hormone between an aqueous alkaline solution and sulphuric ether by alternately extracting a solution containing the ovarian hormone with aqueous alkaline solution and subsequently with sulphuric ether, thereby transferring said hormone successively to said aqueous solution and to said ether solution, and evaporating said sulphuric ether thereby obtaining a residue containing said hormone in high concentration.

10. In the process for obtaining an ovarian hormone from extracts containing the same, the steps of reversibly distributing said hormone between an aqueous alkaline solution and sulphuric ether by extracting a solution containing the ovarian hormone with aqueous alkaline solution, separating the alkaline solution from the residue, extracting said aqueous alkaline solution with sulphuric ether, evaporating the ether solution thereby obtaining a residue containing the ovarian hormone, dissolving said residue in butyl alcohol and petroleum ether and repeating the extraction steps aforesaid thereby obtaining a residue containing the ovarian hormone in high concentration.

11. The process for obtaining an ovarian hormone comprising the treatment of the urine of pregnant animals with butyl alcohol, evaporating the butyl alcohol leaving a residue, extracting said residue with benzol, evaporating said benzol leaving a residue, extracting said residue with butyl alcohol and petroleum ether, extracting said butyl alcohol ether solution with an alkaline solution, extracting said alkaline solution with sulphuric ether, again extracting the ether solution with an alkaline aqueous solution, again extracting the alkaline aqueous solution with an ether solution, evaporating the ether solution to obtain a residual product, crystallizing said residual product and recrystallizing from organic solvents to obtain a pure crystalline product.

EDWARD A. DOISY.
SIDNEY A. THAYER.
CLEMENT D. VELER.